UNITED STATES PATENT OFFICE.

ANTON HUBERT HAMBLOCH, OF ANDERNACH-ON-THE-RHINE, GERMANY, ASSIGNOR TO HENDRIK FRANS BOERSMA, OF THE HAGUE, NETHERLANDS.

MANUFACTURE OF BUILDING-CEMENT.

1,252,264.     Specification of Letters Patent.     Patented Jan. 1, 1918.

No Drawing.     Application filed October 6, 1913. Serial No. 793,684.

*To all whom it may concern:*

Be it known that I, ANTON HUBERT HAMBLOCH, doctor engineer, subject of the Emperor of Germany, residing at Andernach-on-the Rhine, Germany, have invented certain new and useful Improvements in the Manufacture of Building-Cement, of which the following is a specification.

It is known that the resistance of Portland cement to sea water can be enhanced by mixing with it pozzuolana, that is to say a material containing silica capable of becoming cementitious. The chlorids and sulfates in sea water attack that part of the cement that does not become converted into silicates and gradually dissolve it. The construction therefore gradually decays and may even be completely destroyed. Even the alumina in the Portland cement presents a point of attack for the sea water. By adding pozzuolana to the cement, the lime contained in the Portland cement is completely chemically combined to form silicate of lime. This is insoluble and effectively resists the disintegrating action of the sea salts. From this it is clear that in order to obtain the greatest advantage from the joint use of the two materials, cement and pozzuolana or trass, the mixture must be of a most intimate kind and there are produced in addition to the aforesaid chemical action between the free CaO of the cement and soluble $SiO_2$ of the pozzuolana or trass, certain mechanical advantages.

Thus there is an increase of specific gravity of all cements so treated owing to the fact that the specific gravity of pozzuolana is about 50 per cent. greater than that of cement. This considerably increases the surface tension of the product in conjunction with the phenomenon of greater capillarity. Such a cement was originally designed for constructions exposed to sea water; it is however, applicable with equal advantage to the ferro-concrete construction which has lately become so important. Portland cement, or Portland cement mortar is not in itself an ideal mortar material for ferro-concrete construction. It has too little elasticity and owing to its almost negligible resistance to osmosis it is not impervious. Here also, a new constructional material, as described above, is to be desired. Attempts have been made by mere mechanical mixing of cement and pozzuolana or trass, to use the two substances to the best advantage in ferro-concrete construction. These attempts however, have practically all failed, since there has been no certainty in obtaining a correct proportion of cement to the added material.

According to the present invention, however, a cement is produced both for constructions exposed to sea water and for ferro-concrete construction the composition of which is in exact accord with chemical formulæ having regard to the tendency of the two substances to react. Exact determinations have led to the discovery that when the composition of the cement is normal, there must be 0.33 part of pozzuolana to 0.67 part of cement. In cases where the cement has less than 65 per cent. of CaO a proportion of 0.30 : 0.70 is sufficient.

I have found that the most intimate mixing of the substances in question is the most important factor and the present invention consists in making the mixture of materials by a common grinding operation, gypsum being added if necessary to control the setting time and also suitable salts, such as soda or alum or the like, to insure the combination of the excess of lime. The mixture, however, is not to be made with ground cement, but with raw cement clinker, and with the raw material, for example tuff, the other substances mentioned above being added if necessary. Herein lies the novelty of my invention.

Instead of pozzuolana or trass there may be used a suitable clay or mixture of clays which has been opened up by a heating process.

What I claim is:

The herein described process of making cement, which comprises finely and intimately grinding together raw Portland cement clinker and tuff in its raw state.

In testimony whereof, I have hereunto set my hand in presence of two subscribing witnesses.

ANTON HUBERT HAMBLOCH,
                      DOCTOR ENGINEER.

Witnesses:
   ELLIE SCHNIER,
   M. KNEPPERS.